United States Patent
Dongmo Kenfack et al.

(10) Patent No.: US 11,994,444 B2
(45) Date of Patent: May 28, 2024

(54) PART BALANCING

(71) Applicant: GM Global Technology Operations LLC, Detroit, MI (US)

(72) Inventors: Vanessa Dongmo Kenfack, Rochester Hills, MI (US); Dan J. Martin, Ann Arbor, MI (US); Rodney C. Malone, Clarkston, MI (US); Mithun Sunny, Farmington Hills, MI (US); Yew Sum Leong, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 912 days.

(21) Appl. No.: 17/036,344

(22) Filed: Sep. 29, 2020

(65) Prior Publication Data

US 2022/0099517 A1 Mar. 31, 2022

(51) Int. Cl.
*G01M 1/34* (2006.01)

(52) U.S. Cl.
CPC .................................... *G01M 1/34* (2013.01)

(58) Field of Classification Search
CPC .... B24D 3/06; B24D 3/08; B24D 3/10; B24B 37/12; B24B 37/14; B24B 37/16; B24B 19/02; B24B 19/009; B24B 19/26; B24B 19/265
See application file for complete search history.

(56) References Cited

U.S. PATENT DOCUMENTS

| | | | | |
|---|---|---|---|---|
| 4,891,885 A * | 1/1990 | Fischer | ...................... | B24B 3/58 83/676 |
| 5,033,237 A * | 7/1991 | Slough | ..................... | B24B 19/14 451/28 |
| 5,077,941 A * | 1/1992 | Whitney | .................. | B24B 49/16 451/6 |
| 5,363,601 A * | 11/1994 | Baltazar | .................. | B24B 51/00 451/540 |
| 2004/0198197 A1* | 10/2004 | Schwartz | ................ | B24B 35/00 451/61 |
| 2016/0097395 A1* | 4/2016 | Pruitt | ....................... | F04D 17/10 29/888.024 |
| 2017/0089202 A1* | 3/2017 | Wilber | ..................... | F01D 5/143 |
| 2020/0056482 A1* | 2/2020 | Oren | ........................ | F01D 5/027 |
| 2020/0200013 A1* | 6/2020 | Stone | ....................... | F01D 5/027 |

FOREIGN PATENT DOCUMENTS

| | | |
|---|---|---|
| DE | 102010048099 A1 | 4/2012 |
| DE | 102016002793 A1 | 9/2016 |
| DE | 102018203214 A1 | 9/2019 |
| WO | WO-2012045397 A1 * 4/2012 | ............. F01D 5/027 |
| WO | WO-2018007000 A1 * 1/2018 | ............. F01D 5/027 |

* cited by examiner

*Primary Examiner* — Joel D Crandall
(74) *Attorney, Agent, or Firm* — Vivacqua Crane, PLLC (57) ABSTRACT

A method of forming a balancing scallop within a rotating part, including inspecting the rotating part for imbalance, calculating dimensions of the balancing scallop to be formed within the rotating part, positioning the rotating part relative to a material removal machine, starting the tool removal machine, bringing the rotating part and a tool of the material removal machine into engagement, forming a first section of the balancing scallop, forming a second section of the balancing scallop, forming a third section of the balancing scallop, and dis-engaging the rotating part and the tool of the material removal machine.

20 Claims, 4 Drawing Sheets

PART BALANCING

INTRODUCTION

The present disclosure relates to balancing of a rotating part.

A rotating component, if not correctly balanced, will have unbalanced centrifugal forces which will cause noise, component wear, excessive vibration, a reduction of bearing life, and subsequently premature component failure. The faster a component rotates, the more critical balancing becomes.

During the manufacturing of a rotating part, care is generally taken to ensure that components of the rotating part are located as close to their intended locations as practical. However, even with this care, it is not possible to control all factors that affect the location of features of the rotating part. Very small variations in location eventually add up, thereby creating an imbalance of the rotating part. The imbalance may be very small, however, it may still exist.

As the rotating part is rotated, the imbalance, due to centrifugal forces, will start causing the rotating part to vibrate. As the rotational speed is increased, this vibration increases rapidly (by the square of the rotational speed). This means that a small increase in rotational speed can lead to a much larger increase in vibration which will increase the rate at which failure can be expected.

By balancing the rotor assembly, the imbalance condition is either minimized or removed. This allows for the rotating part to run smoothly, without undue vibration, allowing the system to work for extended periods increasing the mean time between failure.

Static balancing is done by holding a rotating part at its axis, then compensating (by removal or addition of mass) for the "heavy" side of the rotating part. During static balancing, the rotating part is not rotating, hence "static". Static balancing is typically done on "flat" parts, or parts that have a large diameter to axial length ratio (pancake like parts, such as fans, pulleys, wheels).

Balancing can be achieved by the addition or removal of mass in certain locations, which is achieved by abrasive material removal or by drilling/machining. Removal of material from a rotating part leads to stress concentration points in the part. Particularly when holes are drilled in a rotating part, stress concentrations must be accounted for as well as structural weakening of the rotating part. To account for these issues, rotating parts must be designed to take into account that material removal will be required and allow for extra material such as a balancing ring or thicker flanges than required by design to achieve mechanical structural integrity.

Thus, while current balancing techniques achieve their intended purpose, there is a need for a new and improved system and method for balancing a rotating part that does not create undue stress concentrations and does not overly compromise the structural integrity of the rotating part.

SUMMARY

According to several aspects of the present disclosure, a method of forming a balancing scallop within a rotating part includes inspecting the rotating part for imbalance, calculating dimensions of the balancing scallop to be formed within the rotating part, positioning the rotating part relative to a material removal machine, starting the tool removal machine, bringing the rotating part and a tool of the material removal machine into engagement, forming a first section of the balancing scallop, forming a second section of the balancing scallop, forming a third section of the balancing scallop, and dis-engaging the rotating part and the tool of the material removal machine According to another aspect, forming a first section of the balancing scallop includes moving the tool of the material removal machine and the rotating part closer together along a central axis of the rotating part, and simultaneously moving the tool of the material removal machine and the rotating part relative to one another along a circumferential path about the central axis of the rotating part, such that the first section of the balancing scallop has a depth that gradually and smoothly transitions from zero at a first distal end of the balancing scallop to a maximum depth at the second section of the balancing scallop.

According to another aspect, forming a second section of the balancing scallop includes holding the tool of the material removal machine and the rotating part stationary relative to each other along the central axis of the rotating part, and simultaneously continuing movement of the tool of the material removal machine and the rotating part relative to one another along a circumferential path about the central axis of the rotating part, such that the depth of the second section of the balancing scallop is the maximum depth.

According to another aspect, forming a third section of the balancing scallop includes moving the tool of the material removal machine and the rotating part apart along the central axis of the rotating part, and simultaneously continuing movement of the tool of the material removal machine and the rotating part relative to one another along a circumferential path about the central axis of the rotating part, such that the third section of the balancing scallop has a depth that gradually and smoothly transitions from the maximum depth adjacent the second section to zero at a second distal end of the balancing scallop.

According to another aspect, forming the first section of the balancing scallop, forming the second section of the balancing scallop, and forming the third section of the balancing scallop includes holding the rotating part stationary and moving the tool of the material removal machine relative to the rotating part along the central axis of the rotating part, and simultaneously moving the tool of the material removal machine relative to the rotating part along a circumferential path about the central axis of the rotating part.

According to another aspect, forming the first section of the balancing scallop, forming the second section of the balancing scallop, and forming the third section of the balancing scallop includes holding the tool of the material removal machine stationary and moving the rotating part relative to the tool of the material removal machine along the central axis of the rotating part, and simultaneously rotating the rotating part about the central axis of the rotating part.

According to another aspect, forming the first section of the balancing scallop, forming the second section of the balancing scallop, and forming the third section of the balancing scallop includes holding the tool of the material removal machine stationary along the central axis and moving the rotating part relative to the tool of the material removal machine along the central axis of the rotating part, and simultaneously moving the tool of the material removal machine relative to the rotating part along a circumferential path about the central axis of the rotating part while preventing the rotating part from rotating about the central axis.

According to another aspect, forming the first section of the balancing scallop, forming the second section of the balancing scallop, and forming the third section of the balancing scallop includes holding the rotating part stationary along the central axis and moving the tool of the material removal machine relative to the rotating part along the central axis, and simultaneously rotating the rotating part about the central axis.

According to another aspect, forming the first section of the balancing scallop, forming the second section of the balancing scallop, and forming the third section of the balancing scallop includes moving the tool of the material removal machine and the rotating part relative to one another to form the balancing scallop in a single pass.

According to another aspect, forming the first section of the balancing scallop, forming the second section of the balancing scallop, and forming the third section of the balancing scallop includes repeatedly moving the tool of the material removal machine and the rotating part relative to one another to form the balancing scallop in a plurality of passes.

According to several aspects of the present disclosure, a method of forming a balancing scallop within a rotating part includes inspecting the rotating part for imbalance, calculating dimensions of the balancing scallop to be formed within the rotating part, positioning the rotating part relative to a material removal machine, starting the tool removal machine, bringing the rotating part and a tool of the material removal machine into engagement, moving the tool of the material removal machine and the rotating part closer together along a central axis of the rotating part, and simultaneously moving the tool of the material removal machine and the rotating part relative to one another along a circumferential path about the central axis of the rotating part, and forming a first section of the balancing scallop having a depth that gradually and smoothly transitions from zero at a first distal end of the balancing scallop to a maximum depth, holding the tool of the material removal machine and the rotating part stationary relative to each other along the central axis of the rotating part, and simultaneously continuing movement of the tool of the material removal machine and the rotating part relative to one another along a circumferential path about the central axis of the rotating part, and forming a second section of the balancing scallop having a depth of the maximum depth, moving the tool of the material removal machine and the rotating part apart along the central axis of the rotating part, and simultaneously continuing movement of the tool of the material removal machine and the rotating part relative to one another along a circumferential path about the central axis of the rotating part, and forming a third section of the balancing scallop having a depth that gradually and smoothly transitions from the maximum depth adjacent the second section to zero at a second distal end of the balancing scallop, and dis-engaging the rotating part and the tool of the material removal machine.

According to another aspect, forming the first section of the balancing scallop, forming the second section of the balancing scallop, and forming the third section of the balancing scallop includes holding the rotating part stationary and moving the tool of the material removal machine relative to the rotating part.

According to another aspect, forming the first section of the balancing scallop, forming the second section of the balancing scallop, and forming the third section of the balancing scallop includes holding the tool of the material removal machine stationary and moving the rotating part relative to the tool of the material removal machine.

According to another aspect, forming the first section of the balancing scallop, forming the second section of the balancing scallop, and forming the third section of the balancing scallop includes holding the tool of the material removal machine stationary along the central axis and moving the rotating part relative to the tool of the material removal machine along the central axis of the rotating part, and simultaneously moving the tool of the material removal machine relative to the rotating part along a circumferential path about the central axis of the rotating part while preventing the rotating part from rotating about the central axis.

According to another aspect, forming the first section of the balancing scallop, forming the second section of the balancing scallop, and forming the third section of the balancing scallop includes holding the rotating part stationary along the central axis and moving the tool of the material removal machine relative to the rotating part along the central axis, and simultaneously rotating the rotating part about the central axis.

According to another aspect, forming the first section of the balancing scallop, forming the second section of the balancing scallop, and forming the third section of the balancing scallop includes moving the tool of the material removal machine and the rotating part relative to one another to form the balancing scallop in a single pass.

According to another aspect, forming the first section of the balancing scallop, forming the second section of the balancing scallop, and forming the third section of the balancing scallop includes repeatedly moving the tool of the material removal machine and the rotating part relative to one another to form the balancing scallop in a plurality of passes.

According to several aspects of the present disclosure, a rotating part including a balancing scallop formed therein includes a body, a balancing scallop formed within an axial surface of the body, the balancing scallop having a radial width, first and second opposing distal ends, a length extending circumferentially around a portion of the axial surface between the first and second distal ends, and first, second and third sections, the balancing scallop formed by bringing the rotating part and a tool of a material removal machine into engagement, moving the tool of the material removal machine and the rotating part closer together along a central axis of the rotating part, and simultaneously moving the tool of the material removal machine and the rotating part relative to one another along a circumferential path about the central axis of the rotating part, and forming the first section of the balancing scallop having a depth that gradually and smoothly transitions from zero at the first distal end of the balancing scallop to a maximum depth, holding the tool of the material removal machine and the rotating part stationary relative to each other along the central axis of the rotating part, and simultaneously continuing movement of the tool of the material removal machine and the rotating part relative to one another along a circumferential path about the central axis of the rotating part, and forming the second section of the balancing scallop having a depth of the maximum depth, and moving the tool of the material removal machine and the rotating part apart along the central axis of the rotating part, and simultaneously continuing movement of the tool of the material removal machine and the rotating part relative to one another along a circumferential path about the central axis of the rotating part, and forming a third section of the balancing scallop having a depth that gradually and smoothly transitions from the maximum depth adjacent the second section to zero at the second distal end of the balancing scallop.

According to another aspect, the balancing scallop is formed by moving the tool of the material removal machine and the rotating part relative to one another to form the balancing scallop in a single pass.

According to another aspect, the balancing scallop is formed by repeatedly moving the tool of the material removal machine and the rotating part relative to one another to form the balancing scallop in a plurality of passes.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
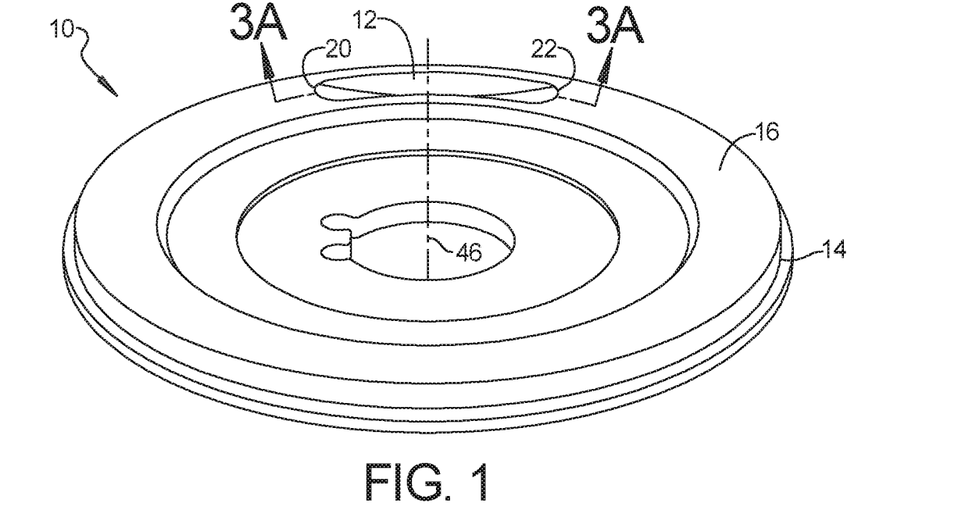
FIG. 1 is a perspective view of a rotating part having a balancing scallop according to an exemplary embodiment.
Figure 2A:
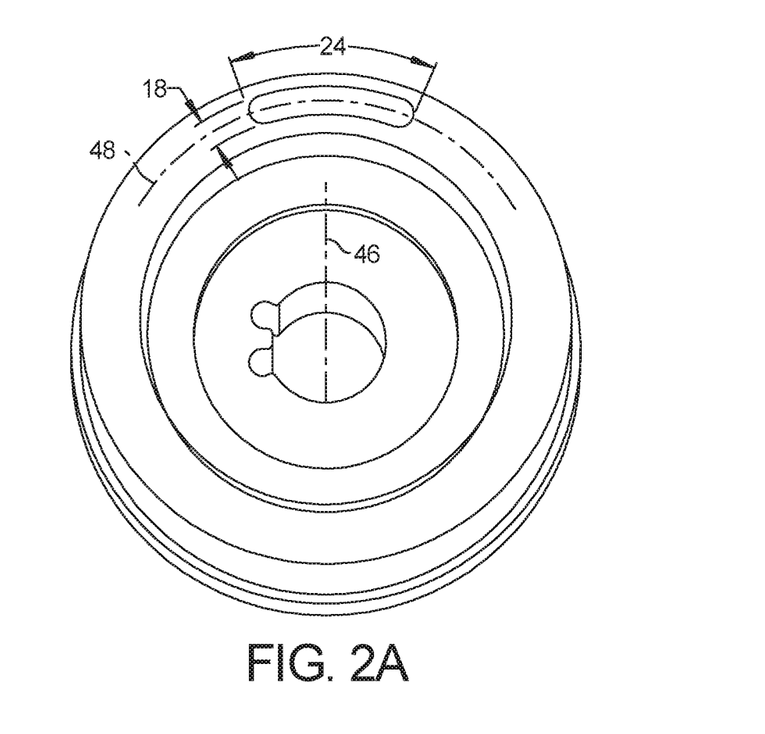
FIG. 2A is another perspective view of the rotating part shown in FIG. 1.
Figure 2B:
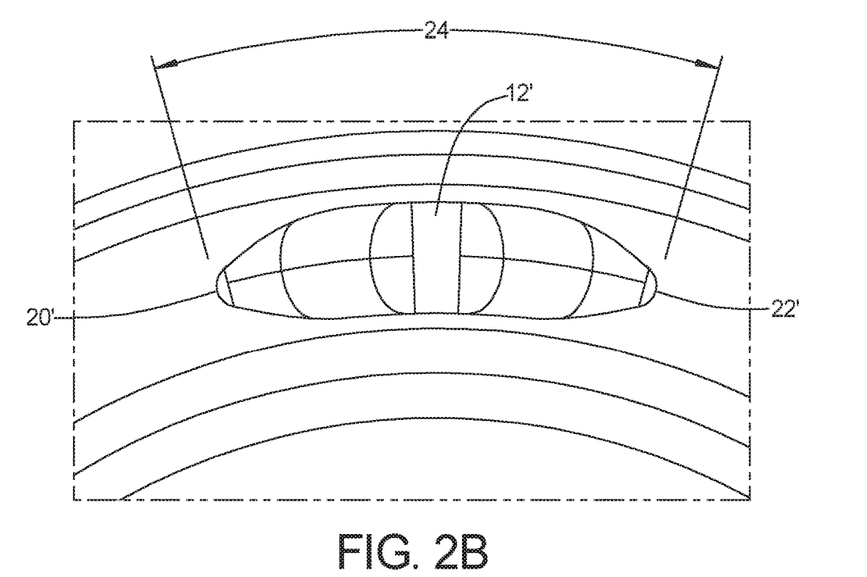
FIG. 2B is a perspective view of a rotating part having a balancing scallop according to another exemplary embodiment.

Referring to FIG. 1 and FIG. 2A, a rotating part 10 includes a balancing scallop 12 formed therein. The rotating part 10 includes a body 14 having an axial surface 16. The balancing scallop 12 is formed within the axial surface 16 of the body 14. The balancing scallop 12 has a radial width 18, first and second opposing distal ends 20, 22, a length 24 extending circumferentially around a portion of the axial surface 16 between the first and second distal ends 20, 22, and first, second and third sections 26, 28, 30.

Figure 3A:
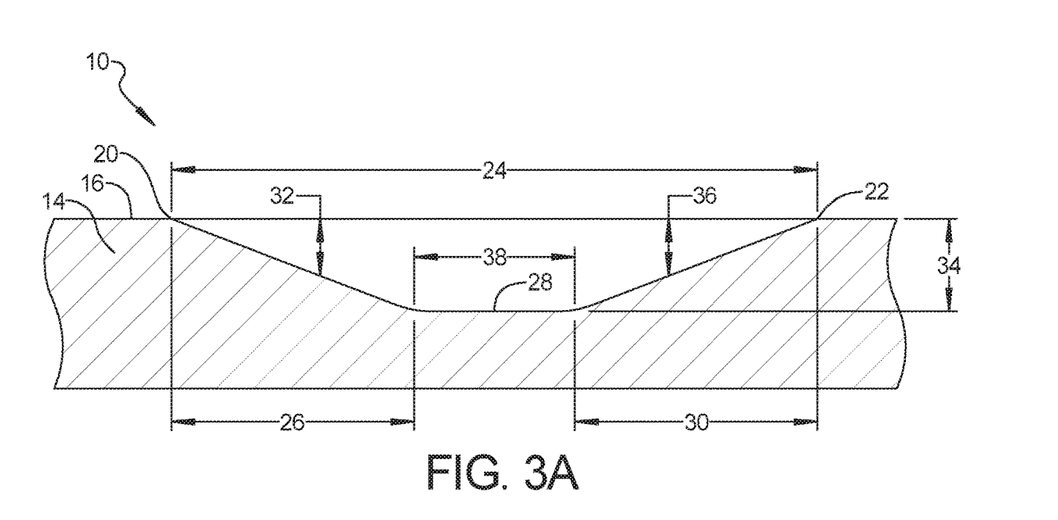
FIG. 3A is a cross sectional view taken along line 3A-3A of FIG. 1.
Figure 3B:
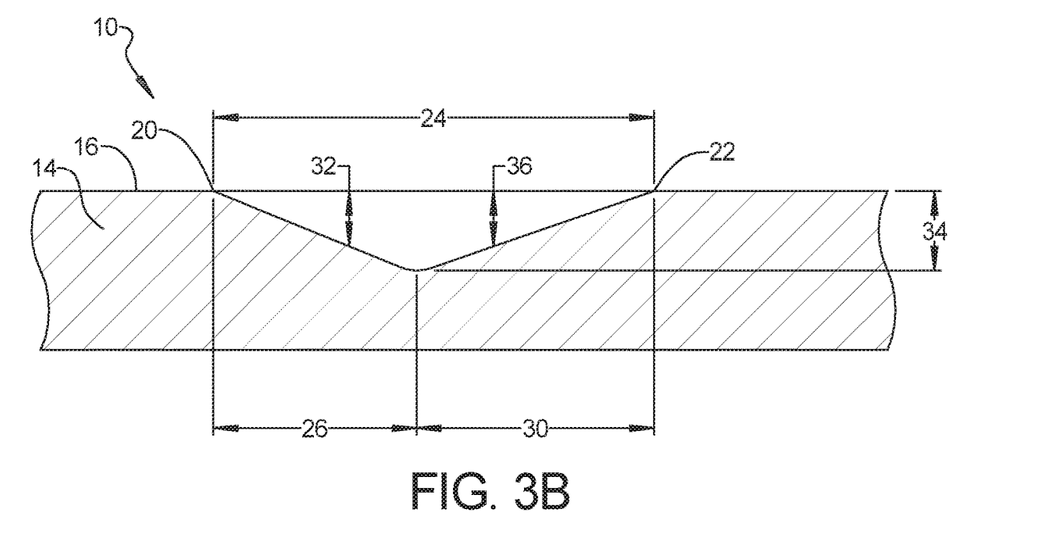
FIG. 3B is a cross sectional view similar to FIG. 3A, of another exemplary embodiment.

Referring to FIG. 3, the first section 26 has a depth 32 that gradually and smoothly transitions from zero at the first distal end 20 of the balancing scallop 12 to a maximum depth 34. The second section 28 of the balancing scallop 12 has a depth equal to the maximum depth 34. The third section 30 of the balancing scallop 12 has a depth 36 that gradually and smoothly transitions from the maximum depth 34 adjacent the second section 28 to zero at the second distal end 22 of the balancing scallop 12.

As shown in FIG. 3A, in an exemplary embodiment, the second section 28 has a length 38 that has a constant depth equal to the maximum depth 34. In another exemplary embodiment, the length 38 of the second section is minimal, and may be zero, as shown in FIG. 3B.

Figure 4:
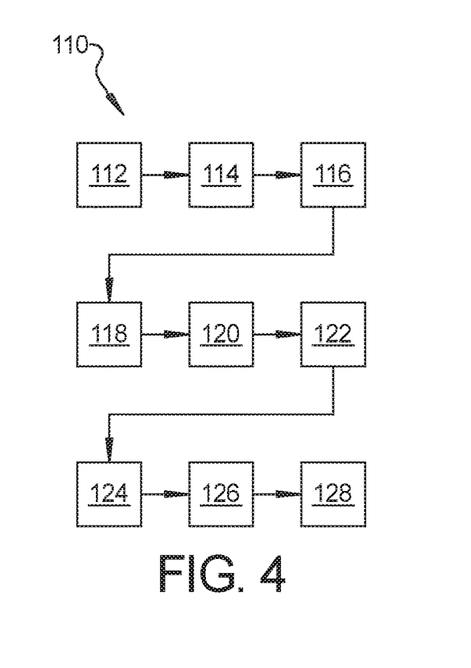
FIG. 4 illustrates a method of forming a rotating part having a balancing scallop in accordance with the present disclosure.

Referring to FIG. 4, a method 110 of forming a balancing scallop 12 within a rotating part 10 is shown. Beginning at block 112, the method includes inspecting the rotating part 10 for imbalance, and moving on to block 114, calculating dimensions of the balancing scallop 12 to be formed within the rotating part 10. Various techniques are known for identifying the magnitude and location of imbalance in the rotating part 10, such as static balancing or dynamic balancing.

Figure 5:
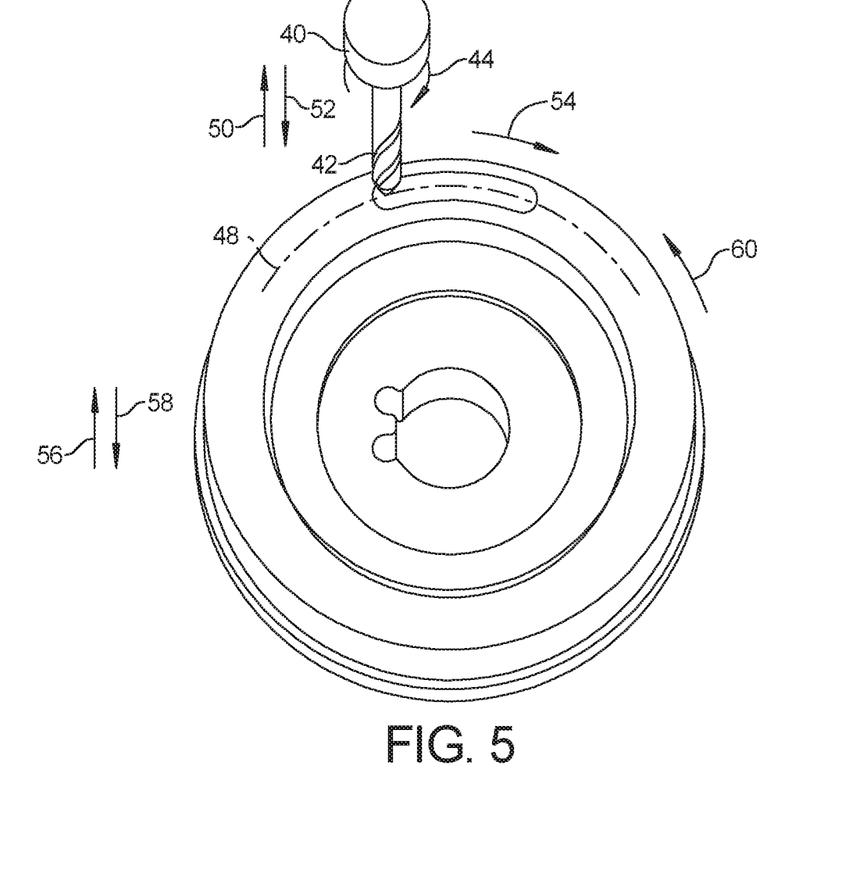
FIG. 5 is a perspective view illustrating the engagement of a tool of a material removal machine and a rotating part according to an exemplary embodiment.

Once the location and magnitude of necessary mass removal from the rotating part 10 is identified, moving to block 116, the rotating part 10 is positioned relative to a material removal machine 40. Referring to FIG. 5, in an exemplary embodiment, the material removal machine 40 is a mill having a tool 42 adapted to engage the rotating part 10 and remove material therefrom. In one exemplary embodiment, wherein the tool 42 is a flat end mill, the resulting balancing scallop 12 has substantially parallel sides ending at circular shaped first and second distal ends 20, 22, as shown in FIG. 2A. In another exemplary embodiment, wherein the tool 42 is a ball end mill, the resulting balancing scallop 12' has substantially parallel sides that begin to taper as they approach the first and second distal ends 20', 22' and the base of the balancing scallop 12' has a rounded transition to the side walls. Moving to block 118, the material removal machine 40 is started, wherein the tool 42 begins to spin at a high rate of speed, as indicated by arrow 44. Moving to block 120, the rotating part 10 and the tool 42 of the material removal machine 40 are brought into engagement.

Moving to block 122, the first section 26 of the balancing scallop 12 is formed. Moving to block 124, the second section 28 of the balancing scallop 12 is formed. Moving to block 126, the third section 30 of the balancing scallop 12 is formed. After the first, second and third sections 26, 28, 30 are formed, moving to block 128, the tool 42 and the rotating part 10 are dis-engaged.

The first section 26 is formed by moving the tool 42 of the material removal machine 40 and the rotating part 10 closer together along a central axis 46 of the rotating part 10, and simultaneously moving the tool 42 of the material removal machine 40 and the rotating part 10 relative to one another along a circumferential path 48 about the central axis 46 of the rotating part 10, such that the depth 32 of the first section 26 of the balancing scallop 12 gradually and smoothly transitions from zero at the first distal end 20 of the balancing scallop 12 to the maximum depth 34 at the second section 28 of the balancing scallop 12.

The second section 28 is formed by holding the tool 42 of the material removal machine 40 and the rotating part 10 stationary relative to each other along the central axis 46 of the rotating part 10, and simultaneously continuing movement of the tool 42 of the material removal machine 40 and the rotating part 10 relative to one another along a circumferential path 48 about the central axis 46 of the rotating part 10, such that the depth of the second section 28 equals the maximum depth 34.

The third section 30 is formed by moving the tool 42 of the material removal machine 40 and the rotating part 10 apart along the central axis 46 of the rotating part 10, and simultaneously continuing movement of the tool 42 of the material removal machine 40 and the rotating part 10 relative to one another along a circumferential path 48 about the central axis 46 of the rotating part 10, such that the depth 36 of the third section 30 of the balancing scallop 12 gradually and smoothly transitions from the maximum depth 34 adjacent the second section 28 to zero at a second distal end 22 of the balancing scallop 12.

Referring to FIG. 5, in an exemplary embodiment, the first, second and third sections 26, 28, 30 of the balancing scallop 12 are formed by holding the rotating part 10 stationary and moving the tool 42 of the material removal machine 40 relative to the rotating part 10 along the central axis 46 of the rotating part 10, as indicated by arrows 50, 52. Simultaneously, the tool 42 of the material removal machine 40 is moved relative to the rotating part 10 along a circumferential path 48 about the central axis 46 of the rotating part 10, as indicated by arrow 54. The tool of the material removal machine is moved downward, as indicated by arrow 52 to form the first section 26, and moved upward, as indicated by arrow 50 to form the third section 30.

In another exemplary embodiment, the first, second and third sections 26, 28, 30 of the balancing scallop 12 are formed by holding the tool 42 of the material removal machine 40 stationary and moving the rotating part 10 relative to the tool 42 of the material removal machine 40 along the central axis 46 of the rotating part 10, as indicated by arrows 56, 58. Simultaneously the rotating part 10 is rotated about the central axis 46 of the rotating part 10, as indicated by arrow 60. The rotating part 10 is moved upward, as indicated by arrow 56 to form the first section 26, and moved downward, as indicated by arrow 58 to form the third section 30.

In still another exemplary embodiment, the first, second and third sections 26, 28, 30 of the balancing scallop 12 are formed by holding the tool 42 of the material removal machine 40 stationary along the central axis 46 and moving the rotating part 10 relative to the tool 42 of the material removal machine 40 along the central axis 46 of the rotating part 10, as indicated by arrows 56, 58. Simultaneously the tool 42 of the material removal machine 40 is moved relative to the rotating part 10 along a circumferential path 48 about the central axis 46 of the rotating part 10, as indicated by arrow 54, while preventing the rotating part 10 from rotating about the central axis 46. The rotating part 10 is moved upward, as indicated by arrow 56 to form the first section 26, and moved downward, as indicated by arrow 58 to form the third section 30.

In still another exemplary embodiment, the first, second and third sections 26, 28, 30 of the balancing scallop 12 are formed by holding the rotating part 10 stationary along the central axis 46 and moving the tool 42 of the material removal machine 40 relative to the rotating part 10 along the central axis 46, as indicated by arrows 50, 52. Simultaneously the rotating part 10 is rotated about the central axis 46, as indicated by arrow 60. The tool 42 of the material removal machine 40 is moved downward, as indicated by arrow 52 to form the first section 26, and moved upward, as indicated by arrow 50 to form the third section 30.

In an exemplary embodiment, the first, second and third sections 26, 28, 30 of the balancing scallop 12 are formed by moving the tool 42 of the material removal machine 40 and the rotating part 10 relative to one another to form the balancing scallop 12 in a single pass. Alternatively, the first, second and third sections 26, 28, 30 of the balancing scallop 12 are formed by repeatedly moving the tool 42 of the material removal machine 40 and the rotating part 10 relative to one another to form the balancing scallop 12 in a plurality of passes, wherein each pass results in the removal of a layer material from the balancing scallop 12 until the final dimensions of the balancing scallop 12 are achieved.

A rotating part 10 having a balancing scallop 12 formed by method of the present disclosure offers several advantages. The balancing scallop 12 of the present disclosure does not create stress concentrations like holes drilled through the part would do. Further, because the balancing scallop 12 of the present disclosure does not extend completely through the rotating part 10, impact to the structural integrity of the rotating part is minimized. A rotating part 10 designed for inclusion of a balancing scallop 12 of the present disclosure does not have to be designed to account for stress concentrations and weakening of structural integrity, allowing the rotating part 10 to be designed efficiently with respect to cost and mass. Further, the rotating part 10 having a balancing scallop 12 formed by the method of the present disclosure provides a reduction in the machine cycle time needed to manufacture the balancing scallop 12 within the rotating part 10, increasing productivity and further reducing manufacturing costs.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of forming a balancing scallop within a rotating part, comprising:
   detecting an imbalance in the rotating part;
   calculating dimensions of the balancing scallop to be formed within the rotating part;
   positioning the rotating part relative to a material removal machine;
   starting the material removal machine by causing a tool of the material removal machine to rotate;
   bringing the rotating part and the tool of the material removal machine into engagement with each other;
   forming a first section of the balancing scallop by moving the tool of the material removal machine and the rotating part closer together along a central axis of the rotating part, and simultaneously moving the tool of the material removal machine and the rotating part relative to one another along a circumferential path about the central axis of the rotating part;
   forming a second section of the balancing scallop;
   forming a third section of the balancing scallop; and
   dis-engaging the rotating part from the tool of the material removal machine.

2. The method of claim 1, wherein
   the first section of the balancing scallop has a depth that gradually and smoothly transitions from zero at a first distal end of the balancing scallop to a maximum depth at the second section of the balancing scallop.

3. The method of claim 2, wherein forming a second section of the balancing scallop includes:
   holding the tool of the material removal machine and the rotating part stationary relative to each other along the central axis of the rotating part, and simultaneously continuing movement of the tool of the material removal machine and the rotating part relative to one another along a circumferential path about the central axis of the rotating part, such that the depth of the second section of the balancing scallop is the maximum depth.

4. The method of claim 3, wherein forming a third section of the balancing scallop includes:
   moving the tool of the material removal machine and the rotating part apart along the central axis of the rotating part, and simultaneously continuing movement of the tool of the material removal machine and the rotating part relative to one another along a circumferential path about the central axis of the rotating part, such that the third section of the balancing scallop has a depth that gradually and smoothly transitions from the maximum depth adjacent the second section to zero at a second distal end of the balancing scallop.

5. The method of claim 4, wherein forming the first section of the balancing scallop, forming the second section of the balancing scallop, and forming the third section of the balancing scallop includes holding the rotating part stationary and moving the tool of the material removal machine relative to the rotating part along the central axis of the rotating part, and simultaneously moving the tool of the material removal machine relative to the rotating part along a circumferential path about the central axis of the rotating part.

6. The method of claim 4, wherein forming the first section of the balancing scallop, forming the second section of the balancing scallop, and forming the third section of the balancing scallop includes holding the tool of the material removal machine stationary and moving the rotating part relative to the tool of the material removal machine along the central axis of the rotating part, and simultaneously rotating the rotating part about the central axis of the rotating part.

7. The method of claim 4, wherein forming the first section of the balancing scallop, forming the second section of the balancing scallop, and forming the third section of the balancing scallop includes holding the tool of the material removal machine stationary along the central axis and moving the rotating part relative to the tool of the material removal machine along the central axis of the rotating part, and simultaneously moving the tool of the material removal machine relative to the rotating part along a circumferential path about the central axis of the rotating part while preventing the rotating part from rotating about the central axis.

8. The method of claim 4, wherein forming the first section of the balancing scallop, forming the second section of the balancing scallop, and forming the third section of the balancing scallop includes holding the rotating part stationary along the central axis and moving the tool of the material removal machine relative to the rotating part along the central axis, and simultaneously rotating the rotating part about the central axis.

9. The method of claim 4, wherein forming the first section of the balancing scallop, forming the second section of the balancing scallop, and forming the third section of the balancing scallop includes moving the tool of the material removal machine and the rotating part relative to one another to form the balancing scallop in a single pass.

10. The method of claim 4, wherein forming the first section of the balancing scallop, forming the second section of the balancing scallop, and forming the third section of the balancing scallop includes repeatedly moving the tool of the material removal machine and the rotating part relative to one another to form the balancing scallop in a plurality of passes.

11. A method of forming a balancing scallop within a rotating part, comprising:
    detecting an imbalance in the rotating part;
    calculating dimensions of the balancing scallop to be formed within the rotating part;
    positioning the rotating part relative to a material removal machine;
    starting the material removal machine by causing a tool of the material removal machine to rotate;
    bringing the rotating part and the tool of the material removal machine into engagement with each other;
    moving the tool of the material removal machine and the rotating part closer together along a central axis of the rotating part, and simultaneously moving the tool of the material removal machine and the rotating part relative to one another along a circumferential path about the central axis of the rotating part, and forming a first section of the balancing scallop having a depth that gradually and smoothly transitions from zero at a first distal end of the balancing scallop to a maximum depth;
    holding the tool of the material removal machine and the rotating part stationary relative to each other along the central axis of the rotating part, and simultaneously continuing movement of the tool of the material removal machine and the rotating part relative to one another along a circumferential path about the central axis of the rotating part, and forming a second section of the balancing scallop having a depth of the maximum depth;
    moving the tool of the material removal machine and the rotating part apart along the central axis of the rotating part, and simultaneously continuing movement of the tool of the material removal machine and the rotating part relative to one another along a circumferential path about the central axis of the rotating part, and forming a third section of the balancing scallop having a depth that gradually and smoothly transitions from the maximum depth adjacent the second section to zero at a second distal end of the balancing scallop; and
    dis-engaging the rotating part from and the tool of the material removal machine.

12. The method of claim 11, wherein forming the first section of the balancing scallop, forming the second section of the balancing scallop, and forming the third section of the balancing scallop includes holding the rotating part stationary and moving the tool of the material removal machine relative to the rotating part.

13. The method of claim 11, wherein forming the first section of the balancing scallop, forming the second section of the balancing scallop, and forming the third section of the balancing scallop includes holding the tool of the material removal machine stationary and moving the rotating part relative to the tool of the material removal machine.

14. The method of claim 11, wherein forming the first section of the balancing scallop, forming the second section of the balancing scallop, and forming the third section of the balancing scallop includes holding the tool of the material removal machine stationary along the central axis and moving the rotating part relative to the tool of the material removal machine along the central axis of the rotating part, and simultaneously moving the tool of the material removal machine relative to the rotating part along a circumferential path about the central axis of the rotating part while preventing the rotating part from rotating about the central axis.

15. The method of claim 11, wherein forming the first section of the balancing scallop, forming the second section of the balancing scallop, and forming the third section of the balancing scallop includes holding the rotating part stationary along the central axis and moving the tool of the material removal machine relative to the rotating part along the central axis, and simultaneously rotating the rotating part about the central axis.

16. The method of claim 11, wherein forming the first section of the balancing scallop, forming the second section of the balancing scallop, and forming the third section of the balancing scallop includes moving the tool of the material removal machine and the rotating part relative to one another to form the balancing scallop in a single pass.

17. The method of claim 11, wherein forming the first section of the balancing scallop, forming the second section of the balancing scallop, and forming the third section of the balancing scallop includes repeatedly moving the tool of the material removal machine and the rotating part relative to one another to form the balancing scallop in a plurality of passes.

18. A rotating part including a balancing scallop formed therein, comprising:
   a body;
   a balancing scallop formed within an axial surface of the body, the balancing scallop having a radial width, first and second opposing distal ends, a length extending circumferentially around a portion of the axial surface between the first and second distal ends, and first, second and third sections;
the balancing scallop formed by:
   bringing the rotating part and a tool of a material removal machine into engagement with each other;
   moving the tool of the material removal machine and the rotating part closer together along a central axis of the rotating part, and simultaneously moving the tool of the material removal machine and the rotating part relative to one another along a circumferential path about the central axis of the rotating part, and forming the first section of the balancing scallop having a depth that gradually and smoothly transitions from zero at the first distal end of the balancing scallop to a maximum depth;
   holding the tool of the material removal machine and the rotating part stationary relative to each other along the central axis of the rotating part, and simultaneously continuing movement of the tool of the material removal machine and the rotating part relative to one another along a circumferential path about the central axis of the rotating part, and forming the second section of the balancing scallop having a depth of the maximum depth; and
   moving the tool of the material removal machine and the rotating part apart along the central axis of the rotating part, and simultaneously continuing movement of the tool of the material removal machine and the rotating part relative to one another along a circumferential path about the central axis of the rotating part, and forming a third section of the balancing scallop having a depth that gradually and smoothly transitions from the maximum depth adjacent the second section to zero at the second distal end of the balancing scallop.

19. The rotating part of claim 18, wherein the balancing scallop is formed by moving the tool of the material removal machine and the rotating part relative to one another to form the balancing scallop in a single pass.

20. The rotating part of claim 18, wherein the balancing scallop is formed by repeatedly moving the tool of the material removal machine and the rotating part relative to one another to form the balancing scallop in a plurality of passes.

* * * * *